Nov. 11, 1969     F. B. THORPE     3,477,336

METHOD OF AND RIVET ASSEMBLY FOR JOINING METAL PANELS

Filed May 17, 1968

Foster B. Thorpe
INVENTOR.

BY *Clarence A. O'Brien*
*and Harvey B. Jacobson*
Attorneys

United States Patent Office 3,477,336
Patented Nov. 11, 1969

3,477,336
METHOD OF AND RIVET ASSEMBLY FOR JOINING METAL PANELS
Foster B. Thorpe, St. Augustine, Fla., assignor to Honeycomb Systems, Inc., a corporation of Florida
Filed May 17, 1968, Ser. No. 730,179
Int. Cl. F16b 13/04, 33/04
U.S. Cl. 85—68                                       2 Claims

ABSTRACT OF THE DISCLOSURE

A rivet structure including a shank portion integrally attached to a head termination. The structure is coaxially bored and includes an expanding pin therein. A piercing point is frictionally retained on the shank end of the rivet. During riveting of two overlying plates, the rivet is driven through the plates and the expanding pin is forced outwardly causing the outward shank portion to deform in a manner causing compression of the plates between the headed and deformed rivet portions. The deformation also causes an expansion and decrease of frictional retention of the piercing member by the rivet which causes the same to separate from the rivet structure.

---

The present invention relates to fasteners and more particularly to a penetrating rivet structure and a method for joining metal panels therewith.

The fastener art is replete with rivet structures and methods for riveting two overlying plates together. However, most rivet structures require a predrilling of aligned holes in the overlying plates to permit the insertion of rivets therein. Many construction procedures require blind riveting which denies one the opportunity of externally deforming or swaging a penetrating rivet end. One attempt to expedite riveting in such an environment includes the utilization of an interiorly bored rivet structure. In operation of such a device, a threaded member is inserted into the rivet after it has been inserted within aligned predrilled holes in overlying plates. The threaded member is then withdrawn from the rivet structure thereby causing deformation of one end thereof which results in abutment between this deformed end and an adjacent plate surface. The opposite end of the rivet structure includes an integrally formed collar positioned in overlying relation with the oppositely disposed outward surface of the associated plate. Accordingly, the overlying plates are sandwiched between abutting rivet surfaces. In completion of this prior art procedure, the threaded member is removed from the rivet structure thereby creating a permanently riveted connection. However, this prior art structure and method requires predrilling overlying plates as well as the time consuming process of inserting a threaded member into a mating threaded bore in the rivet. As will be appreciated, in the construction of building structures where a large number of rivets must be used, the additional time required in installing each rivet increases construction time and cost.

The present invention includes a piercing rivet structure which is driven to penetrate overlying plates without the necessity of predrilling. Further, the structure includes an expanding pin therein which causes deformation of one rivet end upon actuation thereof thus causing an abutment between the deformed end and a corresponding outward surface of an overlying plate. The opposite end of the rivet includes a headed portion retained in abutting relation with an opposite disposed outward surface of the other plate. Therefore, a permanent rivet connection is installed without the necessity of predrilling or swaging the exterior of the rivet from an inaccessible side. Further, the present invention includes a piercing member which is frictionally retained on the penetrating end thereof. This piercing member is caused to expand upon deformation of an associated rivet end which reduces the frictional retention therebetween and finally causes disengagement between the piercing member and the rivet.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2:
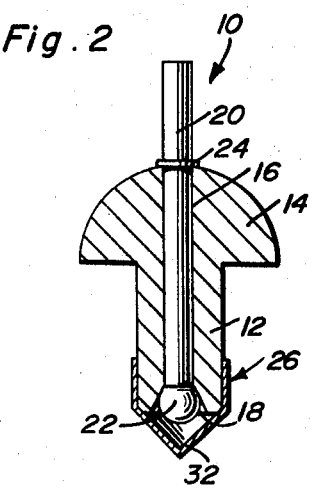
FIGURE 2 is a vertical cross-section of the rivet shown in FIGURE 1.

Referring specifically to the drawings, a preferred embodiment of the present invention is denoted by reference numeral 10 and is seen to include an intermediate shank portion 12 integrally appending to a hemispherical head 14. FIGURE 2 illustrates an axial bore 16 formed through the head and shank portions of the rivet. The end of the rivet oppositely disposed of the headed end includes an inwardly converging conical recess communicating at the apex portion thereof with the aforementioned bore 16. An expanding pin member 20 is longitudinally disposed within the bore 16, the pin member including an outward end thereof extending outwardly of the headed portion 14. The opposite end of the pin member 20 includes a spherical enlarged bulb portion integrally attached thereto and retained in abutting relationship with the surface of conical recess 18. An annular flange 24 is mounted on pin member 20 immediately outwardly of the headed portion 14 thereby causing the pin member 20 to be normally retained within the longitudinal bore 16 between the bulb portion 22 at one end thereof and annular flange 24 at the opposite end thereof.

Figure 1:
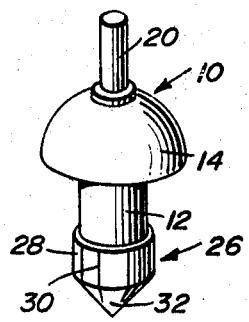
FIGURE 1 is a perspective view of the present rivet structure.

Referring to FIGURE 1, a piercing member denoted by 26 is seen to be frictionally retained at the outward end of shank portion 12. This piercing member includes a right cylindrical portion 28 mounted in overlying frictional relationship with shank portion 12. This cylindrical portion includes longitudinal slits or serrations 30 therein for purposes to become hereinafter apparent. The piercing member 26 also includes an outwardly converging conical portion 32 integrally mounted to the first aforementioned cylindrical portion 28. It is noted that the aforementioned serrations 30 are extended into the conical portion 32.

Figure 4:
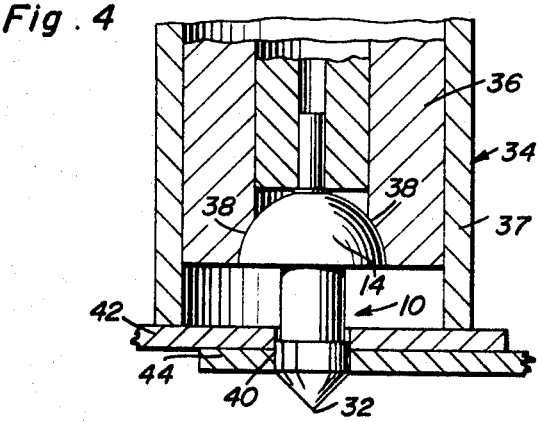
FIGURE 4 illustrates the rivet structure during penetration thereof through overlying plates.
Figure 5:
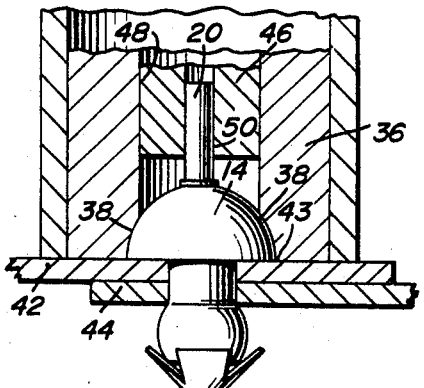
FIGURE 5 is a view similar to FIGURE 4 after the rivet has fully penetrated through the plates.

Attention is directed to FIGURE 4 of the drawings which illustrates the joining of metal panels or plates by means of the present rivet structure pin. By way of example, these panels may be of the form utilized in prefabricated constructions. Forces for driving the rivet through these panels is provided by a double-action rivet gun generally denoted by 34 which may include an actuating mechanism of the conventional gas or explosive charge type (not shown). The outward barrel portion of such a gun is illustrated in FIGURES 4 and 5. FIGURE 4 shows a right cylindrical tubular barrel 37 including a centrally bored piston 36 disposed therein. The outward end of this piston member has a concave spherical recess 38 therein to intimately abut the head portion 14 of the rivet 10. FIGURE 4 illustrates the first phase of an assembling method which includes the downward thrust of piston 36 causing rivet 10 to penetrate and pass through overlying plates 42 and 44. It is noted that no predrilled holes were formed in these plates but instead, an aperture 40 is formed as the rivet penetrates these plates. This phase of operation is completed when the planar surface of the hemispherical head portion 14 is driven to abutting relationship with correspondingly positioned outward surface 42 of plate 42.

Figure 3:
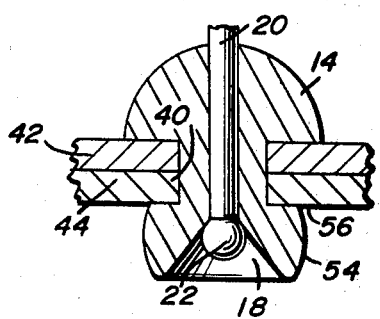
FIGURE 3 is a vertical cross-section of the rivet structure shown securing overlying metal plates, the figure illustrating the deformation process of the rivet.

FIGURE 5 illustrates the second and final phase of operation. The figure shows piston 36 in its extended position retaining rivet head portion 14 in abutting relation with the aforementioned surface 43. A second piston member 46 is concentrically retained within the bore 48 formed coaxially of piston 36. The latter mentioned piston member 46 also includes an axial bore therethrough as denoted by 50. This latter mentioned bore frictionally retains the outward portion of pin member 20 by means of vise gripping action attained by conventional chuck means (not shown) to which piston member 46 is integrally attached. During this phase of operation, piston member 46 is driven upwardly during a second cycle of the aforementioned double-action gun 34. This in turn causes the outward displacement of pin member 20. Reference is made to FIGURE 3 which illustrates the results of this outward displacement of pin member 20. As shown in the figure, bulb portion 22 of pin member 20 is compressively urged against the surface of conical recess 18 which in effect causes an interior swaging process resulting in a buckling or deformation of the shank portion 54 extending outwardly from outward surface 56 of plate 44. This deformation causes a flow of metal resulting in abutting relationship therewith and surface 56, around apertuer 40. Accordingly, plates 42 and 44 experience vising action between deformed shank portion 54 and the rivet head portion 14.

Figure 6:
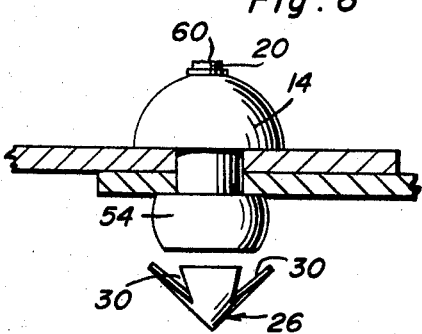
FIGURE 6 is a front elevational view of the rivet structure after complete installation thereof.

FIGURE 6 illustrates an exterior view of the rivet structure during this phase of operation. As seen in the figure the deformation of shank portion 54 causes expansion of piercing member 26 along serrations 30 thereby resulting in a diminution of frictional retention between piercing member 26 and shank portion 54. Finally, the expanded piercing member 26 is caused to separate from the rivet structure. It is noted that a tensile force is continually exerted upon the outward portion of pin member 20. Because bulb portion 22 of pin member 20 prevents passage thereof from recess 18, the pin member is sheared in the vicinity of head portion 14 as indicated by reference numeral 60. The result is a permanently installed rivet structure for joining metal plates or panels.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A rivet structure comprising a shank portion, a head portion integrally attached to one end of said shank portion, said shank portion including a longitudinal bore therethrough, an interior mandrel disposed within said bore, means in the bore coacting between the mandrel and the shank portion to achieve expanding deformation of the shank portion when the mandrel moves, and piercing means mounted on the shank portion remote from the head portion for driving penetration of a workpiece to be riveted, the piercing means including a generally cylindrical portion having slits extending therethrough, the cylindrical portion frictionally being retained on the outward end of the shank portion, and a second outward converging conical piercing portion integrally attached thereto, the piercing portion being adapted to expand upon deformation of the shank portion thereby resulting in loss of frictional retentive thereof whereby the piercing portion falls away from the shank portion.

2. The structure defined in claim 1 wherein the piercing means is constructed of frangible material and further wherein the slits are longitudinally formed through the cylindrical and conical portions to form rupture lines when the end of the shank portion is expanded thereby expanding the piercing means to a plurality of outwardly inclined wings losing frictional contact with the shank portion thereby enabling free expansion thereof to a fastening configuration.

References Cited

UNITED STATES PATENTS

| | | | |
|---|---|---|---|
| 375,373 | 12/1887 | May. | |
| 1,643,112 | 9/1927 | Chisholm. | |
| 2,432,949 | 12/1947 | Thorngren | 85—77 |
| 3,385,156 | 5/1968 | Polos | 85—68 |
| 3,316,796 | 5/1967 | Young | 85—71 |

FOREIGN PATENTS

| | | |
|---|---|---|
| 1,320,197 | 1/1963 | France. |

EDWARD C. ALLEN, Primary Examiner

U.S. Cl. X.R.

85—77